(12) United States Patent
Xu et al.

(10) Patent No.: US 10,302,100 B2
(45) Date of Patent: May 28, 2019

(54) GAS TURBINE ENGINE HAVING A MISTUNED STAGE

(71) Applicant: UNITED TECHNOLOGIES CORPORATION, Hartford, CT (US)

(72) Inventors: JinQuan Xu, Groton, CT (US); Frederic Tisdall Tenney, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 337 days.

(21) Appl. No.: 14/767,602

(22) PCT Filed: Feb. 13, 2014

(86) PCT No.: PCT/US2014/016173
§ 371 (c)(1),
(2) Date: Aug. 13, 2015

(87) PCT Pub. No.: WO2014/130332
PCT Pub. Date: Aug. 28, 2014

(65) Prior Publication Data
US 2016/0017796 A1    Jan. 21, 2016

Related U.S. Application Data

(60) Provisional application No. 61/767,370, filed on Feb. 21, 2013.

(51) Int. Cl.
*F01D 5/14* (2006.01)
*F01D 5/16* (2006.01)
(Continued)

(52) U.S. Cl.
CPC ........... *F04D 29/666* (2013.01); *F01D 5/143* (2013.01); *F01D 5/16* (2013.01); *F02C 3/06* (2013.01);
(Continued)

(58) Field of Classification Search
CPC ...... F05D 2260/961; F01D 5/143; F01D 5/16; F04D 29/542; F04D 29/547; F04D 29/661; F04D 29/666
See application file for complete search history.

(56) References Cited

U.S. PATENT DOCUMENTS

| | | | |
|---|---|---|---|
| 5,397,215 A | 3/1995 | Spear et al. | |
| 5,667,361 A * | 9/1997 | Yaeger | F01D 5/22 416/193 R |

(Continued)

FOREIGN PATENT DOCUMENTS

| | | |
|---|---|---|
| EP | 2 072 758 A2 | 6/2009 |
| WO | 2010/002294 A1 | 1/2010 |

(Continued)

OTHER PUBLICATIONS

International Preliminary Report on Patentability for International application No. PCT/US2014/016173 dated Sep. 3, 2015.

(Continued)

*Primary Examiner* — Mark A Laurenzi
*Assistant Examiner* — Xiaoting Hu
(74) *Attorney, Agent, or Firm* — Carlson, Gaskey & Olds, P.C.

(57) ABSTRACT

A stage of a gas turbine engine according to an exemplary aspect of the present disclosure includes, among other things, a row of flow directing components circumferentially disposed about a centerline axis and at least one flow directing component of the row having at least one design characteristic that is dissimilar from a corresponding design characteristic of at least one other flow directing component of the row.

27 Claims, 7 Drawing Sheets

(51) Int. Cl.
  *F02C 3/06* (2006.01)
  *F04D 29/54* (2006.01)
  *F04D 29/66* (2006.01)

(52) U.S. Cl.
  CPC ......... *F04D 29/542* (2013.01); *F04D 29/547* (2013.01); *F04D 29/661* (2013.01); *F05D 2260/961* (2013.01); *Y02T 50/673* (2013.01)

(56) References Cited

U.S. PATENT DOCUMENTS

| | | | |
|---|---|---|---|
| 6,017,186 | A | 1/2000 | Hoeger et al. |
| 6,283,713 | B1 | 9/2001 | Harvey et al. |
| 6,379,112 | B1* | 4/2002 | Montgomery ............ F01D 5/10 |
| | | | 415/119 |
| 6,471,482 | B2* | 10/2002 | Montgomery ............ F01D 5/10 |
| | | | 416/203 |
| 6,511,294 | B1 | 1/2003 | Mielke et al. |
| 6,561,761 | B1 | 5/2003 | Decker et al. |
| 6,669,445 | B2 | 12/2003 | Staubach et al. |
| 7,134,842 | B2* | 11/2006 | Tam ........................ F01D 5/143 |
| | | | 416/193 A |
| 7,766,618 | B1 | 8/2010 | Liang |
| 8,105,019 | B2 | 1/2012 | McCaffrey et al. |
| 9,097,125 | B2* | 8/2015 | Ghorbani Zarimahalleh .............. F04D 29/666 |
| 2002/0067991 | A1* | 6/2002 | Montgomery ............ F01D 5/10 |
| | | | 416/203 |
| 2007/0175032 | A1 | 8/2007 | Kurt-Elli |
| 2008/0135530 | A1 | 6/2008 | Lee et al. |
| 2009/0056126 | A1* | 3/2009 | Chivers ................... F01D 5/147 |
| | | | 29/889.2 |
| 2009/0191047 | A1 | 7/2009 | Schlinker et al. |
| 2010/0061857 | A1* | 3/2010 | Bracken ................. F01D 5/027 |
| | | | 416/201 R |
| 2010/0247310 | A1 | 9/2010 | Kelly et al. |
| 2012/0148401 | A1 | 6/2012 | Kulathu et al. |
| 2014/0072432 | A1* | 3/2014 | Woehler ................. F01D 5/027 |
| | | | 416/175 |

FOREIGN PATENT DOCUMENTS

WO  WO 2012130341 A1 * 10/2012 ............ F01D 5/027
WO       2013018073 A1    2/2013

OTHER PUBLICATIONS

International Search Report and Written Opinion of the International Searching Authority for International application No. PCT/US2014/016173 dated May 28, 2014.

Extended European Search Report for Application No. EP 14 75 4541 dated Sep. 1, 2016.

* cited by examiner

GAS TURBINE ENGINE HAVING A MISTUNED STAGE

BACKGROUND

This disclosure relates to a gas turbine engine, and more particularly to a gas turbine engine having at least one mistuned stage.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of a gas turbine engine often include multiple stages. Each stage typically includes alternating rows of flow directing components that are circumferentially disposed about a centerline axis of the engine. For example, a stage may include alternating rows of rotating rotor blades and stationary stators. The rotor blades create or extract energy (in the form of pressure) from the core airflow that is communicated through the gas turbine engine. The stators direct the core airflow to the blades to either add or extract energy.

Typically, the flow directing components of each stage are designed to include identical design characteristics. For example, every flow directing component of the stage may include identical airfoil characteristics and endwall platform. Such a design may result in resonance and lead to vibrations within the stage.

SUMMARY

A stage of a gas turbine engine according to an exemplary aspect of the present disclosure includes, among other things, a row of flow directing components circumferentially disposed about a centerline axis. At least one flow directing component of the row includes at least one design characteristic that is dissimilar from a corresponding design characteristic of at least one other flow directing component of the row.

In a further non-limiting embodiment of the foregoing stage, the stage is at least one of a turbine stage, a compressor stage, a mid-turbine frame stage and a fan exit guide vane stage.

In a further non-limiting embodiment of either of the foregoing stages, the row of flow directing components is a row of rotor blades or a row of stators.

In a further non-limiting embodiment of any of the foregoing stages, the at least one design characteristic includes an endwall contour.

In a further non-limiting embodiment of any of the foregoing stages, the endwall contour includes at least one undulation.

In a further non-limiting embodiment of any of the foregoing stages, the at least one design characteristic includes an inner platform endwall contour, an outer platform endwall contour, or both the inner platform endwall contour and the outer platform endwall contour.

In a further non-limiting embodiment of any of the foregoing stages, every other flow directing component of the row includes the at least one design characteristic.

In a further non-limiting embodiment of any of the foregoing stages, the row of flow directing components are grouped in at least a first cluster of flow directing components, at least one of which includes the at least one design characteristic, and a second cluster of flow directing components, at least one of which includes the corresponding design characteristic.

In a further non-limiting embodiment of any of the foregoing stages, the row has at least two design characteristics that are dissimilar from corresponding design characteristics of at least two of the at least one other flow directing component of the row.

In a further non-limiting embodiment of any of the foregoing stages, at least two flow directing components of the row include the at least one design characteristic to balance the stage.

In a further non-limiting embodiment of any of the foregoing stages, the row includes a first plurality of flow directing components, a second plurality of flow directing components and a third plurality of flow directing components interspersed with one another to establish the row. The at least one flow directing component of the row that include the at least one design characteristic is in the first plurality of flow directing components.

In a further non-limiting embodiment of any of the foregoing stages, at least one of the second plurality of flow directing components and the third plurality of flow directing components include the at least one other flow directing component that has the corresponding design characteristic.

In a further non-limiting embodiment of any of the foregoing stages, each of the flow directing components is a turbine component.

In a further non-limiting embodiment of any of the foregoing stages, each of the turbine components is a blade.

In a further non-limiting embodiment of any of the foregoing stages, the row of flow directing components includes at least two flow directing components having the at least one design characteristic.

In a further non-limiting embodiment of any of the foregoing stages, the at least two flow directing components having the at least one design characteristic comprises two flow directing components positioned diametrically opposite one another.

In a further non-limiting embodiment of any of the foregoing stages, the at least two flow directing components having the at least one design characteristic comprises three or more flow directing components that are equally circumferentially spaced from one another.

A turbine section according to another exemplary aspect of the present disclosure includes among other things, a row of flow directing components circumferentially disposed about a centerline axis. At least one flow directing component of the row includes at least one design characteristic that is dissimilar from a corresponding design characteristic of at least one other flow directing component of the row.

In a further embodiment of the foregoing turbine section, the row of flow directing components is a balanced row of flow directing components.

In a further embodiment of either of the foregoing turbine sections, the row of flow directing components is an unbalanced row of flow directing components.

A gas turbine engine according to another exemplary aspect of the present disclosure includes a stage having, among other things, a row of flow directing components circumferentially disposed about a centerline axis. At least one flow directing component of the row includes at least one design characteristic that is dissimilar from a corresponding design characteristic of at least one other flow directing component of the row.

In a further embodiment of the foregoing gas turbine engine, at least one additional stage is a mistuned stage.

A method of designing a stage of a gas turbine engine according to another exemplary aspect of the present disclosure includes, among other things, positioning a row of flow directing components in an array within the gas turbine engine. At least one flow directing component of the row includes at least one design characteristic that is dissimilar from a corresponding design characteristic of at least one other flow directing component of the row.

In a further non-limiting embodiment of the foregoing method, the step of positioning includes providing the at least one flow directing component with an airfoil characteristic that is different from an airfoil characteristic of the at least one other flow directing component of the row.

In a further non-limiting embodiment of either of the foregoing methods, the step of positioning includes providing the at least one flow directing component with an endwall contour that is different from an endwall contour of the at least one other flow directing component of the row.

In a further non-limiting embodiment of any of the foregoing methods, the step of positioning includes providing the at least one flow directing component with an airfoil characteristic and an endwall contour that are different from an airfoil characteristic and endwall contour of the at least one other flow directing components of the row.

In a further non-limiting embodiment of any of the foregoing methods, the row includes at least one flow directing component that excludes the at least one design characteristic.

The various features and advantages of this disclosure will become apparent to those skilled in the art from the following detailed description. The drawings that accompany the detailed description can be briefly described as follows.

DETAILED DESCRIPTION

Figure 1:
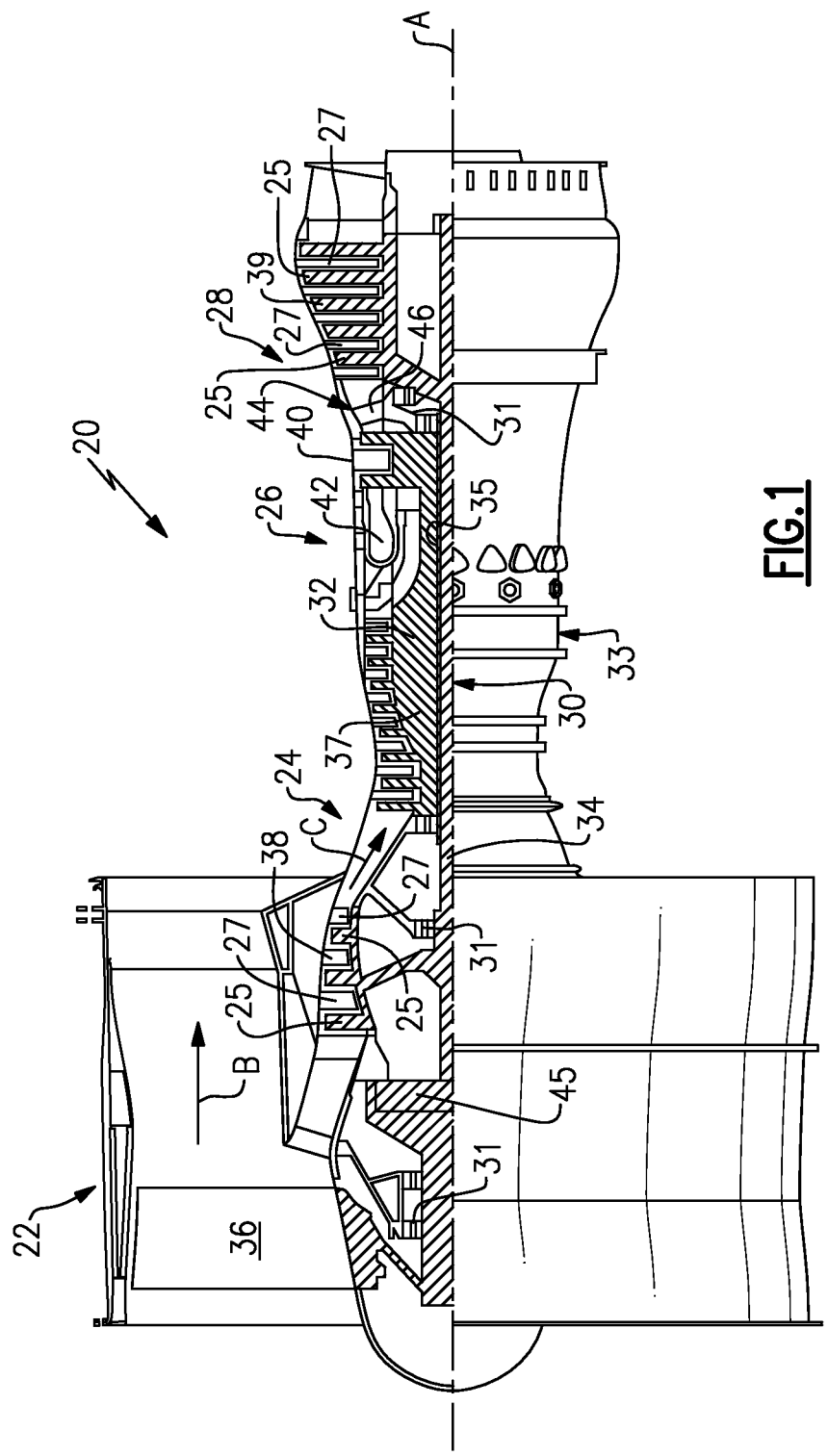
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 may be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged axially between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28, and may include a plurality of airfoils 46 that extend within the core flow path C between an inner platform and an outer platform.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise—Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T ram° R)/(518.7° R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include multiple stages having a plurality of flow directing components. For example, a stage may include alternating rows of rotor blades 25 and stators 27 (i.e., vanes) that extend into the core flow path C. The rotor blades 25 create or extract energy (in the form of pressure) from the core airflow that is communicated through the gas turbine engine 20 along the core flow path C. The stators 27 direct the core airflow to the rotor blades 25 to either add or extract energy.

Among other aspects, one aspect of this disclosure addresses mistuned stage designs that may be incorporated into portions of the gas turbine engine 20. As used herein, "mistuned" simply means that the structural characteristics of the components of a given stage are not the same. At the same time, the structural characteristics may, in some embodiments, be balanced, for example, in an array of rotating blades so as to enable an equal distribution of weight in such an array. Among other benefits, structurally mistuned stages can reduce resonance and vibration that may occur during gas turbine engine operation due to, for example, differences in successive airfoil arrays.

Figure 2A:
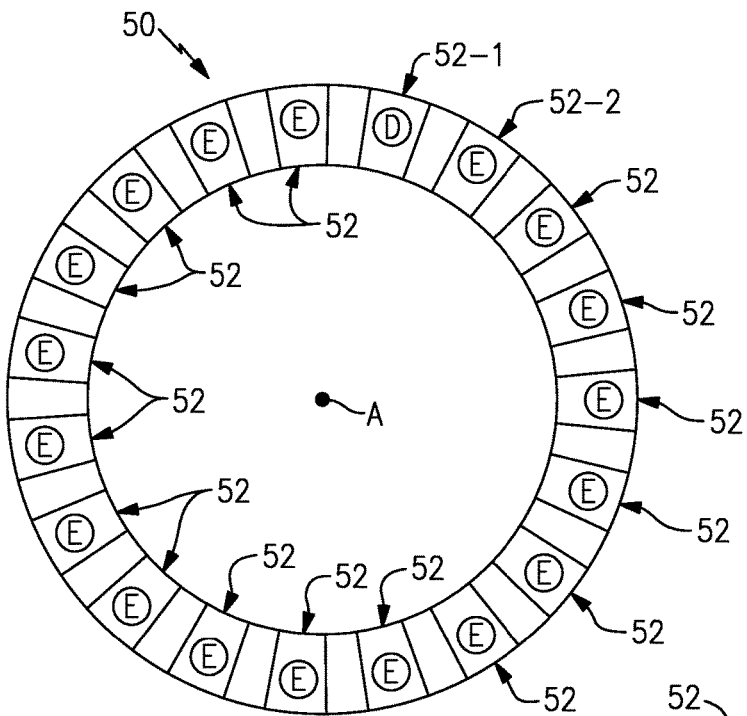
FIGS. 2A, 2B and 2C schematically illustrate exemplary mistuned stages of a gas turbine engine.
Figure 2B:
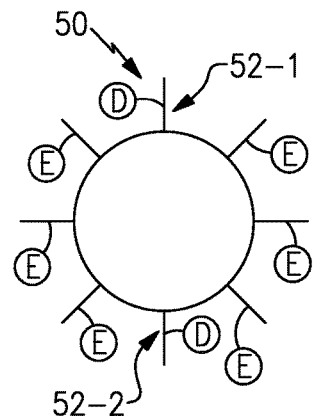
Figure 2C:
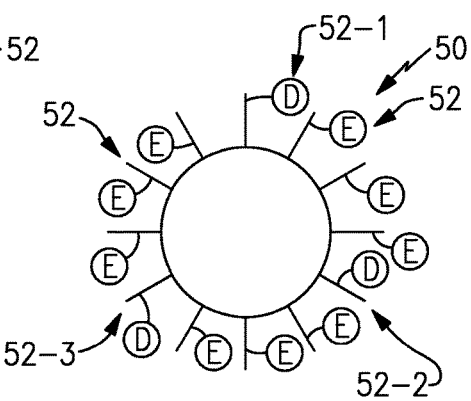

FIGS. 2A, 2B and 2C illustrate exemplary stages 50 of a gas turbine engine, such as the gas turbine engine 20. The stages 50 may be a turbine stage, a compressor stage, a mid-turbine frame stage, or a fan exit guide vane stage of the gas turbine engine 20. It should be appreciated that the exemplary stages 50 could be incorporated into any portion of the gas turbine engine 20 that may benefit from mistuning.

The stages 50 include a row of flow directing components 52 that form an annular ring circumferentially disposed about the engine centerline longitudinal axis A. The stages 50 could include any number of flow directing components 52. The actual number of flow directing component 52 may vary based on design specific parameters, including but not limited to, the necessary flow, efficiency, balance and weight distribution requirements of the stage 50.

Figure 3A:
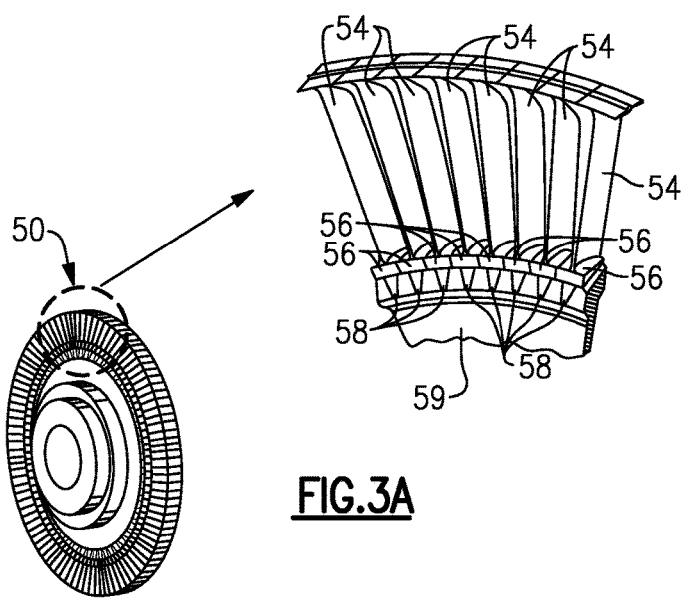
FIG. 3A illustrates one embodiment of a stage of a gas turbine engine that can be mistuned.
Figure 3B:
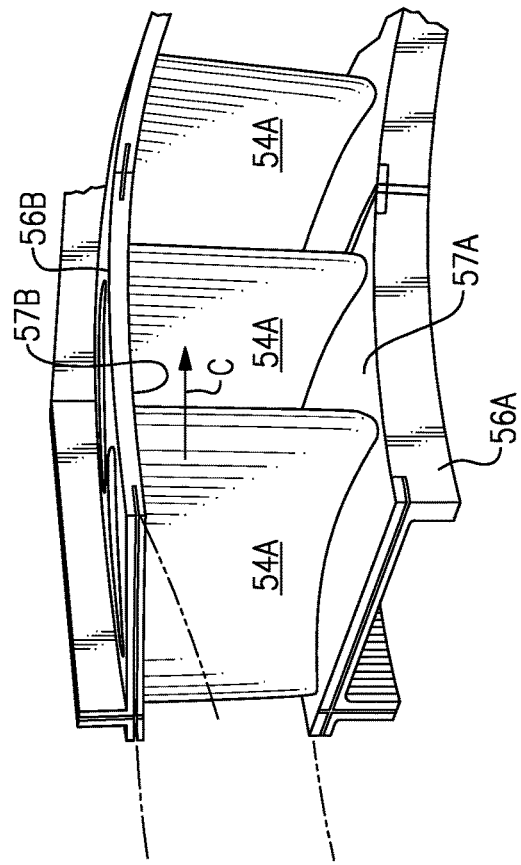
FIG. 3B illustrates another embodiment of a stage of a gas turbine engine that can be mistuned.
Figure 3B:
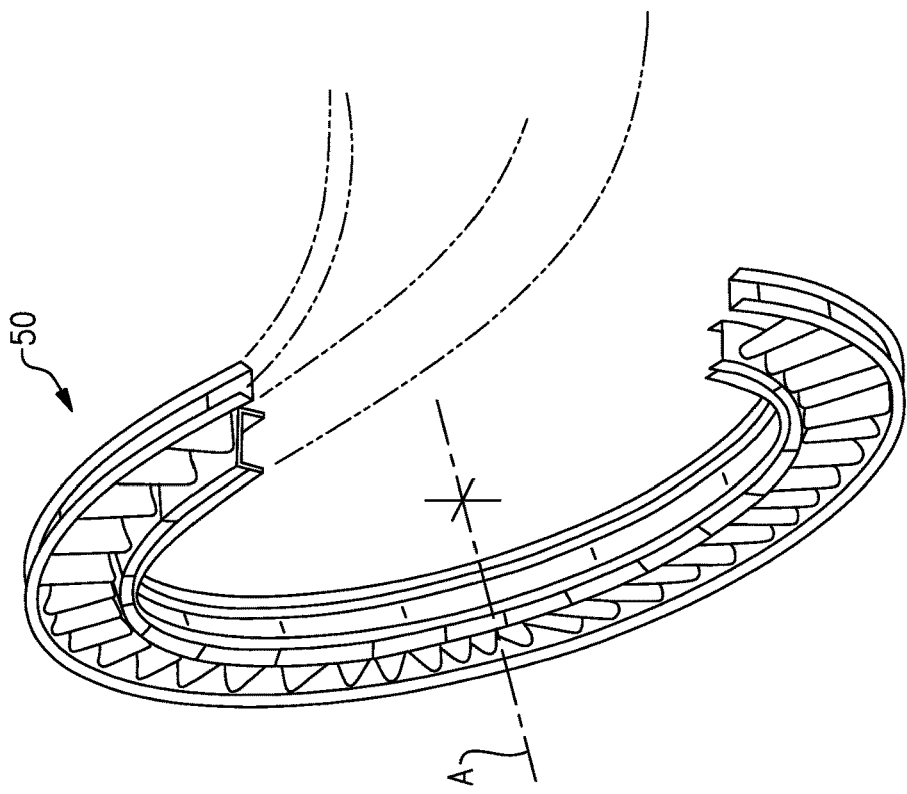

The row of flow directing components 52 may be a row of rotor blades having airfoils 54 that extend from platforms 56 and roots 58 that are received by a disk 59 (see FIG. 3A). Alternatively, the row of flow directing components 52 could include a row of stators having airfoils 54A that extend between inner 56A and outer platforms 56B (see FIG. 3B). In yet another embodiment, the row of stators could be cantilevered such that the airfoils 54A only extend from the outer platform 56B (not shown). The inner and outer platforms 56A, 56B include radially inner and outer endwalls 57A, 57B that establish the flow boundaries of the core flow path C (see FIG. 3B).

The stage 50 of the exemplary embodiment of FIG. 2A is a mistuned stator stage. For example, at least one flow directing component 52-1 of the row of flow directing components 52 can include a design characteristic D that is dissimilar or different in some manner from a corresponding design characteristic E that may be incorporated into one or more of the remaining flow directing components of the row of flow directing components 52. Of course, this view is highly schematic, and any one or more (but not all) of the flow directing components of the row of flow directing components 52 could include the dissimilar design characteristic D. In addition, more than one stage of a section of the gas turbine engine 20 can be mistuned.

In a mistuned rotor stage example shown in FIG. 2B, at least two flow directing components 52-1 and 52-2 may incorporate the dissimilar design characteristics D from the remaining flow directing components 52 in order to balance the rotor stage. In one embodiment, the flow directing components 52-1 and 52-2 are diametrically opposite one another (see FIG. 2B) in order to balance the rotor stage. In another embodiment, as best illustrated in FIG. 2C, flow directing components 52-1, 52-2 and 52-3 may include dissimilar design characteristics D from the remaining flow directing components 52 of the row, which include corresponding design characteristics E. The flow directing components 52-1, 52-2 and 52-3 may be equally spaced relative to one another, such as at the 12:00, 4:00 and 8:00 positions, to balance the rotor stage.

Figure 4A:
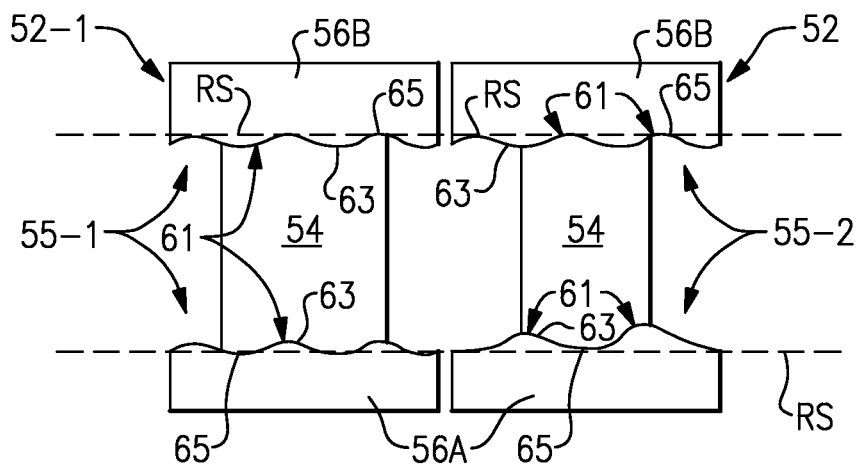
FIG. 4A illustrates a portion of a mistuned gas turbine engine stage that includes a flow directing component having a dissimilar design characteristic from one or more of the remaining flow directing components of the stage.

The flow directing component(s) 52-1 may be dissimilar or different from one or more of the remaining flow directing components 52 of the stage 50 in terms of any design characteristic. In one embodiment, the design characteristic D of the flow directing component 52-1 and the corresponding design characteristic E of the remaining flow directing components 52 represent different endwall contours of the platforms 56 (or 56A, 56B) of the flow directing components 52. For example, as shown in FIG. 4A, dissimilar endwall contours 55-1 and 55-2 can be provided on one (inner or outer) or both of the platforms 56A, 56B of the flow directing component 52-1 and the remaining flow directing components 52 (only one shown) of the stage 50. Each endwall contour 55-1, 55-2 can include at least one undulation 61 that extends relative to a reference surface RS of the platforms 56A, 56B. The reference surface RS represents a reference wall of the platform 56A, 56B having zero elevation. The undulations 61 define peaks 63 (having positive elevations) and valleys 65 (having negative elevations) relative to the reference surface RS.

Figure 4C:
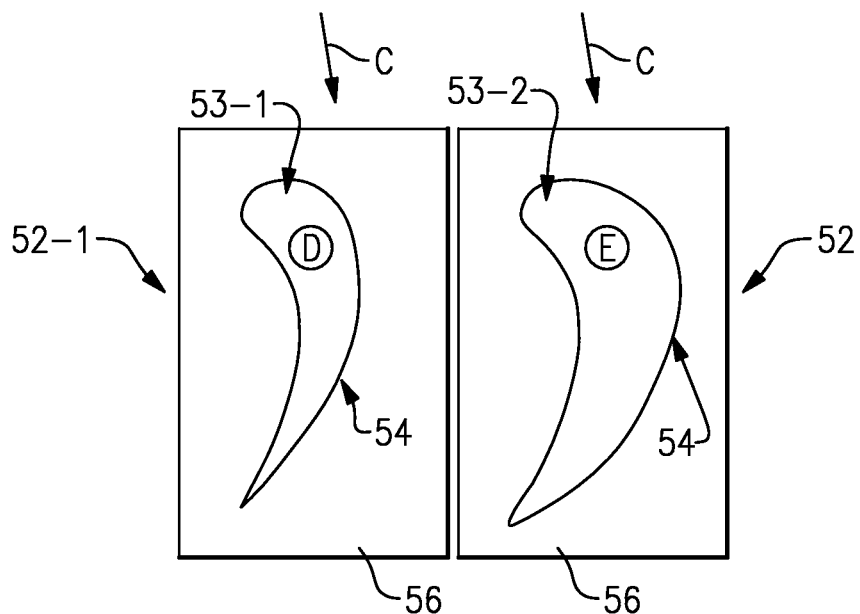
FIG. 4C illustrates another embodiment of a mistuned gas turbine engine stage.
Figure 4B:
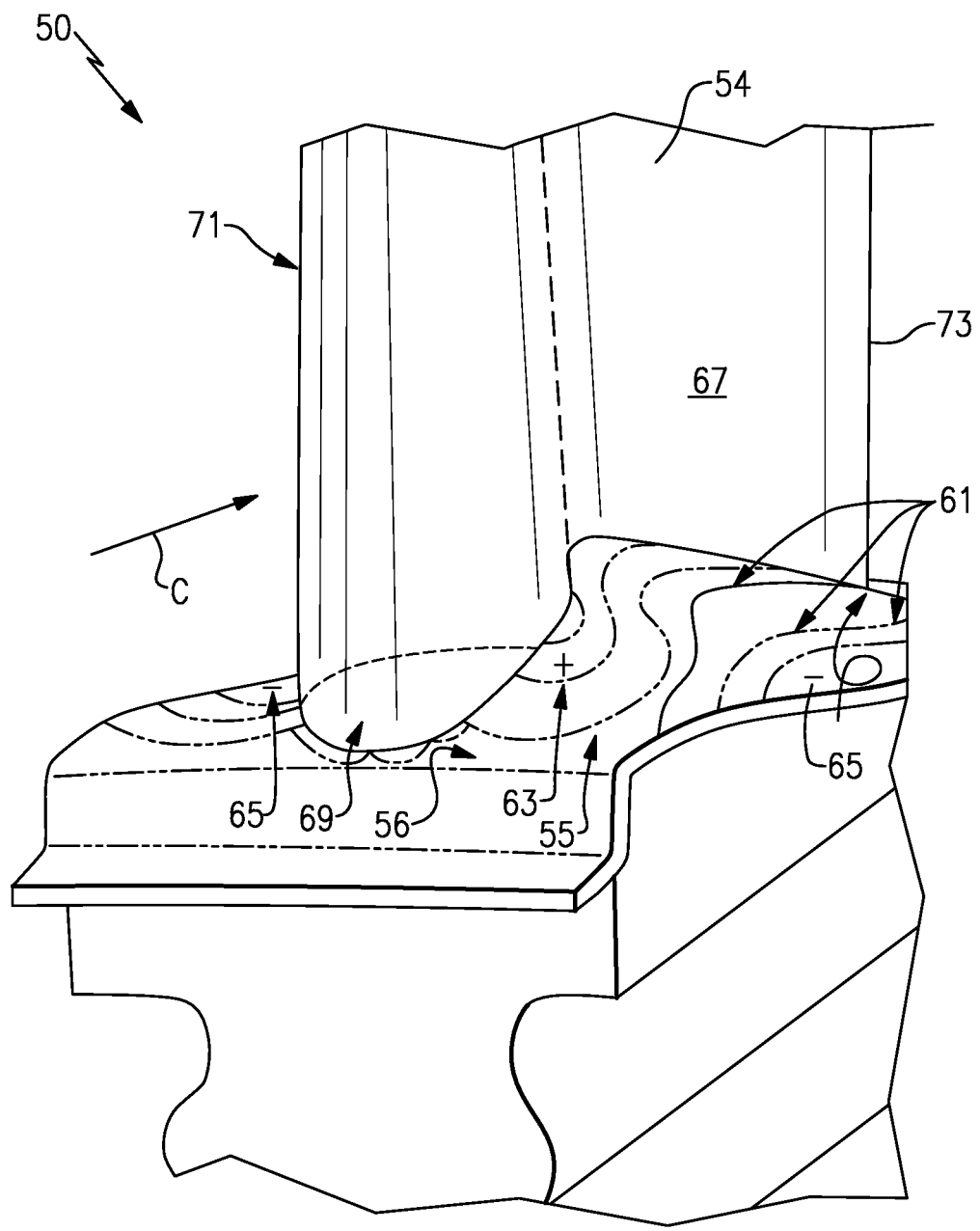
FIG. 4B illustrates another embodiment of a mistuned gas turbine engine stage.

A platform 56 of an exemplary stage 50 is illustrated by FIG. 4B. The platform 56 of this embodiment may exhibit a changing contour. In other words, the platform 56 includes an endwall contour 55.

The endwall contour 55 includes undulations 61 that define peaks 63 and valleys 65 that may be located for reducing the strength of flow vortices within the gas path and improving gas turbine engine efficiency. In this embodiment, a peak 63 directly adjoins an airfoil pressure side 67 of the airfoil 54 adjacent to a leading edge 69 of the airfoil 54, and a valley 65 directly adjoins an airfoil suction side 71 of the airfoil 54 aft of the leading edge 69.

The peak 63 and the valley 65 are effective for reducing flow acceleration of the combustion gases of the core flow path C, increasing local static pressure, altering gradients in gas pressure, reducing vortex stretching, and reducing reorientation of the flow vortices as they are communicated across the endwall contour 55.

Since a platform 56 could extend on both sides of each airfoil 54, the elevated peaks 63 and depressed valleys 65 will smoothly transition with each other. The peak 63 may decrease in height or elevation as it wraps around the leading edge 69 to join the valley 65 of the endwall contour 55 along the suction side 71. The valley 65 extends along the suction side 71 between the leading edge 69 and a trailing edge 73.

In one embodiment, the peak 63 may be centered with maximum height at the pressure side 67 adjacent to the leading edge 69, and decreases in height forward around the leading edge 69, and aft towards the trailing edge 73, as well as laterally or circumferentially from the pressure side 67 toward the suction side 71 of an adjacent airfoil (not shown). In addition, the valley 65 may be centered with maximum depth at the suction side 71 near the maximum lateral thickness of the airfoil 54, and decreases in depth forward towards the leading edge 69, aft towards the trailing edge 73, as well as laterally or circumferentially from the suction 71 side towards the pressure side 67 of an adjacent airfoil (not shown).

It should be understood that FIG. 4B represents but one possible endwall contour configuration. This embodiment is only intended to provide a schematic representation of a platform having a changing contour that could be incorporated into a gas turbine engine stage and be mistuned relative to the platforms of the other flow directing components contained therein.

In another embodiment, the design characteristic D of the flow directing component 52-1 and the corresponding design characteristic E of the remaining flow directing components 52 of the stage 50 represent different airfoil characteristics of the airfoils 54 of the flow directing component 52. For example, as shown in FIG. 4C, dissimilar airfoil pitch designs 53-1 and 53-2 (angle of airfoils relative to oncoming airflow) can be provided within the airfoils 54 of the flow directing component 52-1 and the remaining flow directing components 52 (only one shown) of the stage 50. Alternatively or additionally, the design characteristics D, E could include other mistuned airfoil characteristics, including but not limited to, different airfoil shapes, airfoil materials, and airfoil counts, etc.

In yet another embodiment, more than one design characteristic of the flow directing component 52-1 is dissimilar from corresponding design characteristics of the remaining flow directing components 52. For example, both the airfoil characteristics and endwall contouring of the flow directing component 52-1 may be different from these same parameters in the remaining flow directing components 52 of the stage 50. In yet another embodiment, an airfoil characteristic of the flow directing component 52-1 is dissimilar from the remaining flow directing components 52, and an endwall contour of another component 52-2 is dissimilar from the remaining flow directing components 52 (see FIG. 2A).

Figure 5:
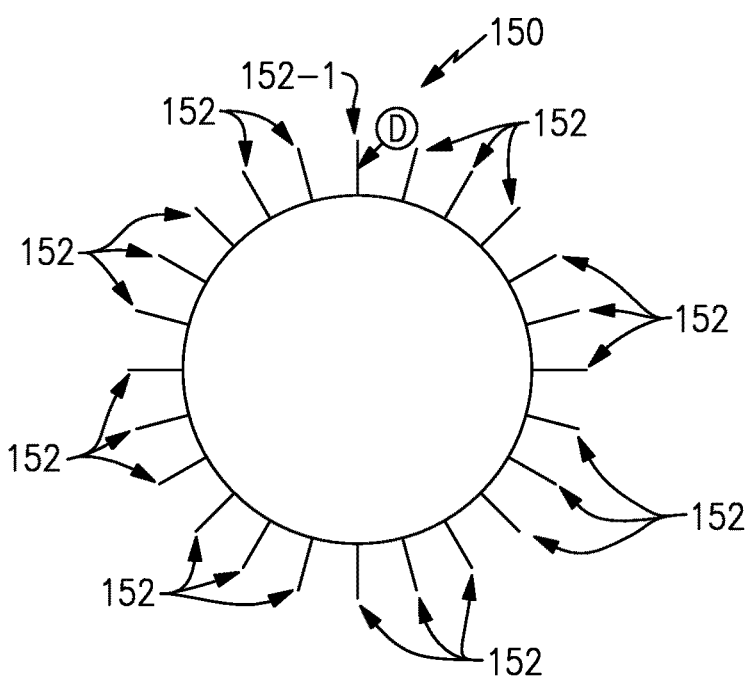
FIG. 5 illustrates another exemplary mistuned stage of a gas turbine engine.

FIG. 5 schematically illustrates another exemplary mistuned stage 150, wherein like elements have the same element numbers as previous embodiments except with the addition of a numeral one for a prefix. In this embodiment, a flow directing component 152-1 of the stage 150 includes a design characteristic D (shown schematically) that is completely excluded from the remaining flow directing components 152 of the stage 150. For example, the flow directing component 152-1 could include endwall contouring, whereas the remaining flow directing components 152 are designed to exclude endwall contouring. As another example, the remaining flow directing components 152 are designed to include endwall contouring, whereas the flow directing component 152-1 is designed to exclude endwall contouring.

Figure 6:
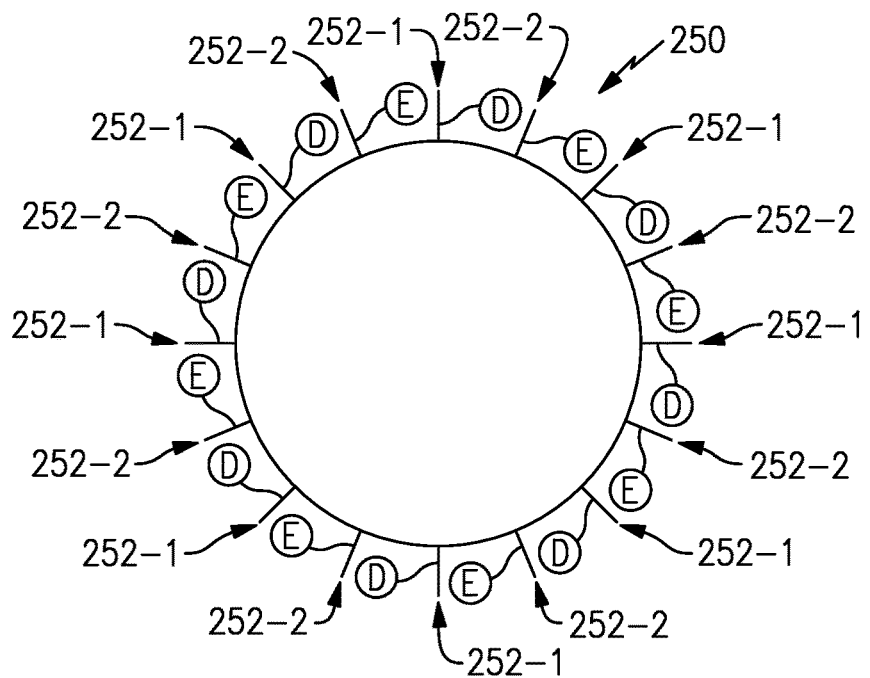
FIG. 6 illustrates another embodiment of a mistuned gas turbine engine stage.

FIG. 6 illustrates another embodiment of a stage 250 that can be incorporated into the gas turbine engine 20, wherein like elements have the same element numbers as previous embodiments except with the addition of a numeral two for a prefix. The stage 250 includes a row of flow directing components 252. In this embodiment, every other flow directing component 252-1 of the row of flow directing components 52 may include a design characteristic D that is dissimilar from a corresponding design characteristic E incorporated into alternating flow directing components 252-2.

Figure 7:
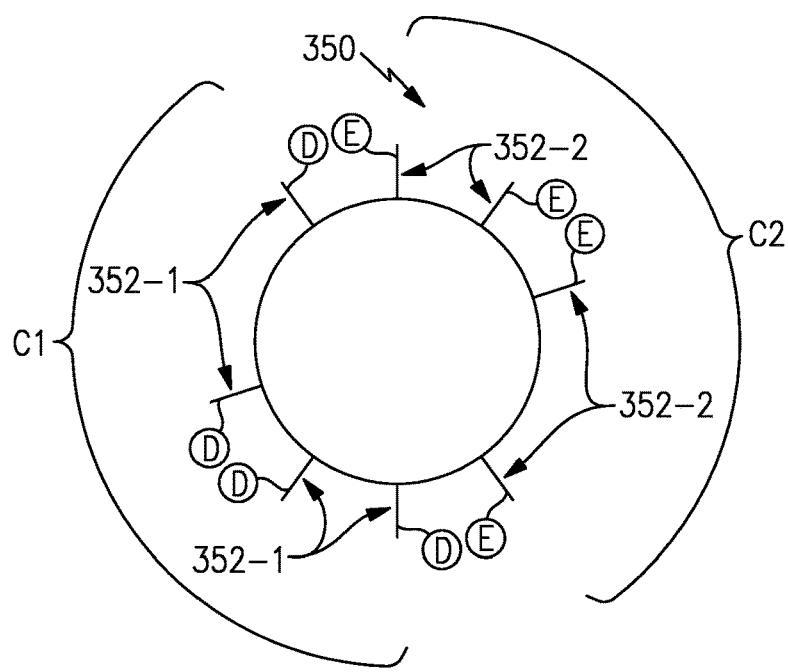
FIG. 7 illustrates another embodiment of a mistuned gas turbine engine stage.

FIG. 7 illustrates yet another embodiment of a stage 350 of the gas turbine engine 20, wherein like elements have the same element numbers as previous embodiments except with the addition of a numeral three for a prefix. In this embodiment, a row of flow directing components 352 is grouped in at least a first cluster C1 of flow directing components 352-1 and a second cluster C2 of flow directing components 352-2. Of course, the stage 350 could include additional groupings of clusters. The flow directing components 352-1 of the first cluster C1 may incorporate a design characteristic D and the flow directing components 352-2 of the second cluster C2 may incorporate a corresponding design characteristic E that is dissimilar from the design characteristic D.

Figure 8:
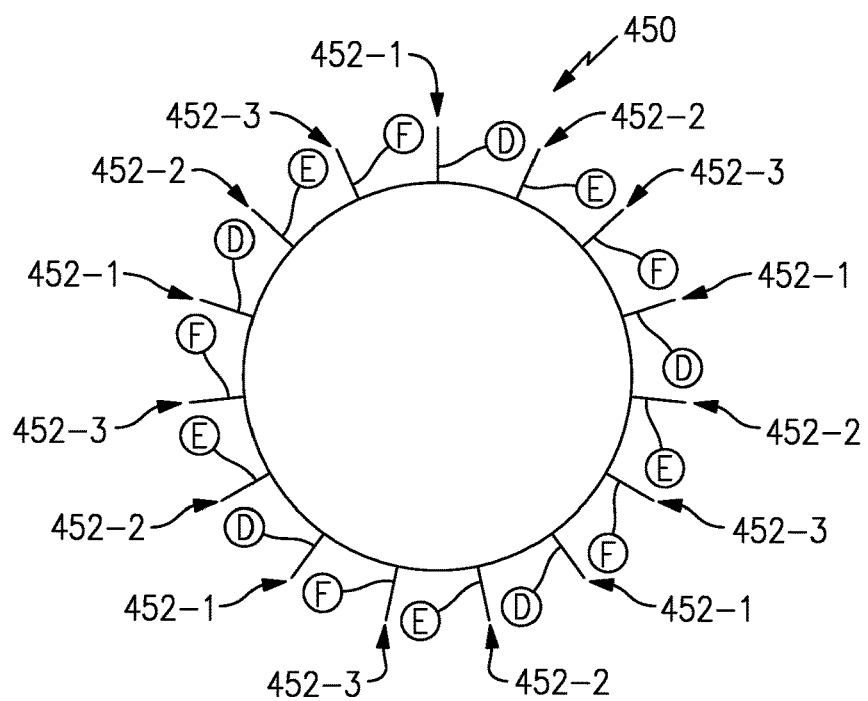
FIG. 8 illustrates yet another embodiment of a mistuned gas turbine engine stage.

FIG. 8 illustrates yet another embodiment of a stage 450 that can be incorporated into a gas turbine engine 20, wherein like elements have the same element numbers as previous embodiments except with the addition of a numeral four for a prefix. In this embodiment, the stage 450 includes a row of flow directing components 452 that is made up of a first plurality of flow directing components 452-1, a second plurality of flow directing components 452-2, and a third plurality of flow directing components 452-3. Additional or fewer pluralities of flow directing component could make up the stage 450. The first, second, and third pluralities of flow directing components 452-1, 452-2 and 452-3 may be interspersed between one another to establish the row of flow directing components 452. The first, second, and third plurality of flow directing components 452-1, 452-2 and 452-3 can include at least one design characteristic that is dissimilar to a corresponding design characteristic of the other of the first, second, and third plurality of flow directing components 452-1, 452-2 and 452-3. In this embodiment, first plurality of flow directing components 452-1 include design characteristics D, the second plurality of flow directing components 452-2 include design characteristics E, and the third plurality of flow directing components 452-3 include design characteristics F. The design characteristics D, E and F may be dissimilar from one another.

Although in the stator stage embodiments described and shown herein the flow directing components contain dissimilar design characteristics D, E and/or F that are located at any location of the array, such may not be the case for rotor stages. For example, for an array of blades, it will be appreciated that the flow directing components containing dissimilar design characteristics D, E and/or F may be equally spaced around the array in order to facilitate weight balancing of the blade array.

It should be understood that this disclosure is not limited to the exact configurations shown by these examples. Other design characteristics of a stage may additionally or alternatively be mistuned. The exemplary mistuned stages of this disclosure may mitigate resonance and vibration during gas turbine engine operation. This may result in increased gas turbine engine efficiency, reliability, durability and increased operative life of the flow directing components incorporated into each stage.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A stage of a gas turbine engine, comprising:
   a row of flow directing components circumferentially disposed about a centerline axis; and
   at least one flow directing component of said row having at least one platform endwall contour that includes a peak that adjoins an airfoil pressure side of the at least one flow directing component and a valley that adjoins an airfoil suction side of the at least one flow directing component, such that said at least one platform endwall contour is dissimilar from a corresponding platform endwall contour of at least one other flow directing component of said row.

2. The stage as recited in claim 1, wherein said stage is at least one of a turbine stage, a compressor stage, a mid-turbine frame stage and a fan exit guide vane stage.

3. The stage as recited in claim 1, wherein said row of flow directing components is a row of rotor blades or a row of stators.

4. The stage as recited in claim 1, wherein said peak and valley provides a first group of undulations, and said corresponding platform endwall contour includes a second group of undulations dissimilar from said first group.

5. The stage as recited in claim 1, wherein every other flow directing component of said row includes said corresponding platform endwall contour.

6. The stage as recited in claim 1, wherein said row of flow directing components are grouped in at least a first cluster of flow directing components at least one of which includes said at least one platform endwall contour and a second cluster of flow directing components at least one of which includes said corresponding platform endwall contour.

7. The stage as recited in claim 1, wherein said row has at least two design characteristics that are dissimilar from corresponding design characteristics of at least two of said at least one other flow directing component of said row.

8. The stage as recited in claim 1, wherein at least two flow directing components of said row include said at least one platform endwall contour to balance said stage.

9. The stage as recited in claim 1, wherein said row includes a first plurality of flow directing components, a second plurality of flow directing components and a third plurality of flow directing components interspersed with one another to establish said row, and wherein said at least one flow directing component of said row having said at least one platform endwall contour is in said first plurality of flow directing components.

10. The stage as recited in claim 9, wherein at least one of said second plurality of flow directing components and said third plurality of flow directing components include said at least one other flow directing component that has said corresponding platform endwall contour.

11. The stage as recited in claim 1, wherein each of said flow directing components is a turbine component.

12. The stage as recited in claim 11, wherein each of said turbine components is a blade.

13. The stage as recited in claim 1, wherein said row of flow directing components includes at least two flow directing components having said at least one platform endwall contour.

14. The stage as recited in claim 13, wherein said at least two flow directing components having said at least one platform endwall contour comprises two flow directing components positioned diametrically opposite one another.

15. The stage as recited in claim 13, wherein said at least two flow directing components having said at least one platform endwall contour comprises three or more flow directing components that are equally circumferentially spaced from one another.

16. A turbine section comprising said stage of claim 1.

17. The turbine section as recited in claim 16, wherein said row of flow directing components is a balanced row of flow directing components.

18. The turbine section as recited in claim 16, wherein said row of flow directing components is an unbalanced row of flow directing components.

19. A gas turbine engine comprising said stage of claim 1.

20. The gas turbine engine as recited in claim 19, comprising at least one additional stage that is a mistuned stage.

21. A method of designing a stage of a gas turbine engine, comprising the step of:
    positioning a row of flow directing components in an array within the gas turbine engine, wherein at least one flow directing component of the row includes at least one platform endwall contour that includes a peak that adjoins an airfoil pressure side of the at least one flow directing component and a valley that adjoins an airfoil suction side of the at least one flow directing component, such that said at least one platform endwall contour is dissimilar from a corresponding platform endwall contour of at least one other flow directing component of the row.

22. The method as recited in claim 21, wherein the step of positioning includes providing the at least one flow directing component with an airfoil characteristic that is different from an airfoil characteristic of the at least one other flow directing component of the row.

23. The method as recited in claim 22, wherein the row includes at least one flow directing component that excludes the airfoil characteristic.

24. The method as recited in claim 21, wherein the step of positioning includes providing the at least one flow directing component with an airfoil pitch and an outer platform endwall contour that are different from an airfoil pitch and an outer platform endwall contour of the at least one other flow directing components of the row.

25. A stage of a gas turbine engine, comprising:
    a row of flow directing components circumferentially disposed about a centerline axis;

a first flow directing component of said row includes a first airfoil pitch that is dissimilar from a second airfoil pitch of every other flow directing component of said row; and a second flow directing component of said row includes a design characteristic that is dissimilar from a corresponding design characteristic of every other flow directing component of said row, wherein the design characteristic is a different design characteristic from the airfoil pitch.

26. The stage as recited in claim 25, wherein the stage is a turbine stage, a compressor stage, a mid-turbine frame stage, or a fan exit guide vane stage.

27. The stage as recited in claim 25, wherein the design characteristic is an endwall contour.

\* \* \* \* \*